United States Patent Office 3,363,976
Patented Jan. 16, 1968

3,363,976
SELECTIVE REMOVAL OF ALUMINA
FROM PHOSPHATE ROCK
Albert F. Vondrasek, Lakeland, Fla., assignor to International Minerals & Chemical Corporation, New York, N.Y., a corporation of New York
No Drawing. Filed May 25, 1964, Ser. No. 370,084
9 Claims. (Cl. 23—109)

ABSTRACT OF THE DISCLOSURE

This invention relates to a process for the extraction of aluminum contaminants from phosphate rock using an aqueous alkali such as sodium hydroxide in a concentration of about 2 to 9%, whereby concomitant extraction of phosphate values is substantially avoided.

---

The presence of aluminum compounds in phosphate rock is deleterious because the aluminum compounds produce insoluble aluminum phosphates and iron-aluminum complexes in phosphoric acid manufactured from phosphate rock by the wet process. Purchasers of phosphate rock prefer rock which is low in aluminum content not only when the phosphate rock is used for the production of phosphoric acid, but also where the phosphate rock is used in the manufacture of normal or triple superphosphate.

The modes of occurrences of aluminum in phosphate rock are manifold. In sedimentary apatites or fluor-apatites, such as Florida pebble phosphate, aluminum apparently substitutes in the fluorapatite structure where minor cationic and anionic radical substitutions are commonplace. Phosphate rock generally is associated with other minerals which also contain aluminum values. Some of these minerals are crandallite, wavellite and clays. Crandallite and wavellite are aluminum phosphates while clays are chiefly aluminum silicates.

The prior art has recognized the possibility of extracting aluminum values from phosphatic ores of high aluminum content, particularly ores which are high in crandallite and wavellite. U.S. Patent No. 2,843,456, for example, discloses a process by which the aluminum values are solubilized by a strong caustic leach. The art also discloses the removal of aluminum from igneous apatite by strong caustic leach, as in U.S. Patent 2,843,456. This patentee states his process to be unworkable, however, with sedimentary phosphate (fluorapatite).

It is an object of this invention to provide an improved method for the reduction of aluminum contaminants in sedimentary phosphate rock. A more specific object of this invention is to provide a reduction of aluminum contaminants in sedimentary phosphate rock by leaching with dilute caustic. Other objects of this invention will become apparent from the following description.

It has been found, that this invention is based in part on the discovery, that a substantial portion of the aluminum contaminants in sedimentary phosphate rock, such as Florida pebble phosphate, can be solubilized and removed by caustic leaching. More specifically, it has been found that when phosphate rock such as fluorapatite is leached with an aqueous solution of alkali-metal hydroxide or carbonate having a concentration in the range of 2% to 9%, calculated as hydroxide, a substantial portion of the aluminum values in the phosphate rock are solubilized without substantial loss of phosphatic values.

Briefly, the method of this invention comprises agitating a phosphate rock in an aqueous solution of alkali leach liquor of controlled concentration, with agitation, for a period of about three minues to 15 minutes. The temperature of the leach can suitably be in the range from ambient temperatures to the boiling point of the leach liquor.

Leach liquors suitable for use in accordance with this invention are aqueous solutions of alkali-metal hydroxides or carbonates having a concentration in the range of 2% to 9% of the alkali-metal carbonate or hydroxide, calculated as the hydroxide. Concentrations below about 2% are unsatisfactory in that insufficient aluminum is solubilized and the removal of aluminum values is largely incomplete. Alkali concentrations in excess of about 9% are unsatisfactory because above this concentration phosphate values are solubilized and lost to the leach liquor. The leach is preferably carried out under conditions of mild agitation, such as are provided in a horizontal rotating drum-type leach tank. The time of leach is not critical, but best results are obtained using a contact time of at least three minutes. No additional benefit is obtained when the leach time is beyond about 15 minutes. A contact time of about five minutes is preferred. The temperature of the operation is not critical, satisfactory results being obtained in the range of ambient to the boiling point of the liquid. Solubilization occurs more rapidly at elevated temperatures, and in some cases a higher degree of aluminum removal is possible at elevated temperatures approaching the boiling point of the leach liquor. In some cases, however, any advantage obtained by carrying out the process at an elevated temperature, such as 80° C. to 100° C., as compared with ambient temperature, is offset by the cost of providing heat to the system.

Exemplary of suitable caustic leach solutions are aqueous solutions of sodium hydroxide, lithium hydroxide, potassium hydroxide, sodium carbonate, lithium carbonate and potassium carbonate. Sodium hydroxide and sodium carbonate are preferred.

EXAMPLE 1

A sample of Senegal phosphate rock concentrate was reacted with a 5% NaOH solution for a period of 10 minutes at a temperature of 100° C. The leach liquor was then decanted and the rock washed with water. The rock before and after leaching assayed as follows:

|  | Before Leaching, Percent | After Leaching, Percent |
|---|---|---|
| BPL (Bone Phosphate of Lime) | 81.28 | 81.29 |
| $Fe_2O_3$ | 1.21 | 1.25 |
| $Al_2O_3$ | 1.16 | 0.38 |

EXAMPLE 2

A sample of Senegal phosphate rock concentrate was placed in an autoclave with a 5% solution of soda ash, reacted for 10 minutes at 150 p.s.i. at 182° C. The rock and reactant leach liquor were removed, the leach liquor decanted off, and the rock washed. The rock before and after reaction assayed as follows:

|  | Before Leaching, Percent | After Leaching, Percent |
|---|---|---|
| BPL | 81.28 | 81.07 |
| $Fe_2O_3$ | 1.21 | 1.21 |
| $Al_2O_3$ | 1.16 | 0.76 |

EXAMPLE 3

A sample of Florida phosphate rock concentrate was leached with a 5% NaOH solution for a period of 15 minutes at a temperature of 65° C. with continuous mechanical stirring. The leach liquor was filtered off and the residue washed several times. The phosphate rock concentrate before and after leaching assayed the following:

| | Before Leaching, Percent | After Leaching, Percent |
|---|---|---|
| $Al_2O_3$ | 0.93 | 0.65 |
| $Fe_2O_3$ | 0.81 | 0.72 |

EXAMPLE 4

Samples of Senegal phosphate rock concentrate were leached with 5% solutions of KOH and LiOH for a period of 15 minutes at a temperature of around 85° C. with continuous stirring. The leach liquor was filtered off, and the rock washed with water several times. The phosphate rock concentrates before and after leaching assayed as follows:

| Leach Liquor | Percent $Al_2O_3$ Before Leaching | Percent $Al_2O_3$ After Leaching |
|---|---|---|
| 5% KOH | 1.14 | 0.86 |
| 5% LiOH | 1.14 | 0.81 |

While the invention has been described with reference to the preferred embodiments and has been illustrated by a number of specific examples, it will be understood that within the scope of the appended claims the present invention can be practiced other than as specifically described.

The embodiments of the invention in which an exclusive property or privilege is claimed are defined as follows:

1. The method of removing aluminum values from phosphate rock comprising leaching said prosphate rock with an aqueous solution of alkali agents of the group consisting of alkali-metal hydroxides and carbonates in the amount of 2% to 9% by weight, calculated as the hydroxide, at a temperature in the range of about ambient temperature to about the boiling point of said solution at existing pressures for a time in excess of three minutes.

2. The method in accordance with claim 1 in which the temperature at which the leach is carried out is about 80° to 100° C.

3. The method in accordance with claim 2 in which the time of leach is five minutes to 15 minutes.

4. The method in accordance with claim 1 in which said agent consists essentially of sodium hydroxide.

5. The method in accordance with claim 4 in which the concentration of caustic is about 5% by weight, and the time of leach is about five to fifteen minutes.

6. The method in accordance with claim 5 in which said temperature is ambient temperature.

7. The method in accordance with claim 5 in which said temperature is in the range of 80° to 100° C.

8. The method in accordance with claim 1 in which said agent consists essentially of sodium carbonate.

9. The method in accordance with claim 8 in which the concentration of caustic is about 5% by weight, and the time of leach is about five to fifteen minutes.

References Cited

UNITED STATES PATENTS

| 1,618,105 | 2/1927 | Pedersen | 23—143 |
| 2,591,436 | 4/1952 | James | 23—52 |
| 2,843,456 | 7/1958 | Porter | 23—143 |
| 2,905,526 | 9/1959 | McCullough | 23—143 X |

MILTON WEISSMAN, *Primary Examiner.*

OSCAR R. VERTIZ, *Examiner.*

G. T. OZAKI, *Assistant Examiner.*